Nov. 24, 1931.  J. B. DUDLEY  1,833,562

LIQUID HEATER

Filed Nov. 6, 1929

INVENTOR.
John B. Dudley
BY Francis D. Hardesty
ATTORNEY.

Patented Nov. 24, 1931

1,833,562

UNITED STATES PATENT OFFICE

JOHN B. DUDLEY, OF DETROIT, MICHIGAN

LIQUID HEATER

Application filed November 6, 1929. Serial No. 405,112.

The present invention relates to liquid heaters and more especially for heaters for heating water to generate steam for house heating and other purposes.

Among the objects of the invention is a device of the type indicated which shall provide a very great heating capacity in proportion to the size of the unit.

Another object is to more efficiently effect heat transfer from the heating medium to the water or other liquid being heated than has heretofore been accomplished.

Another object is a heater in which the body of liquid is preferably much smaller than has heretofore been considered necessary.

Another object is a simple form of metal unit which may be very easily constructed and which may be easily installed.

Still other objects will readily occur to those skilled in the art upon reference to the following description and the accompanying drawings in which Fig. 1 is a vertical section through a furnace showing the installation of the device.

Figure 1:
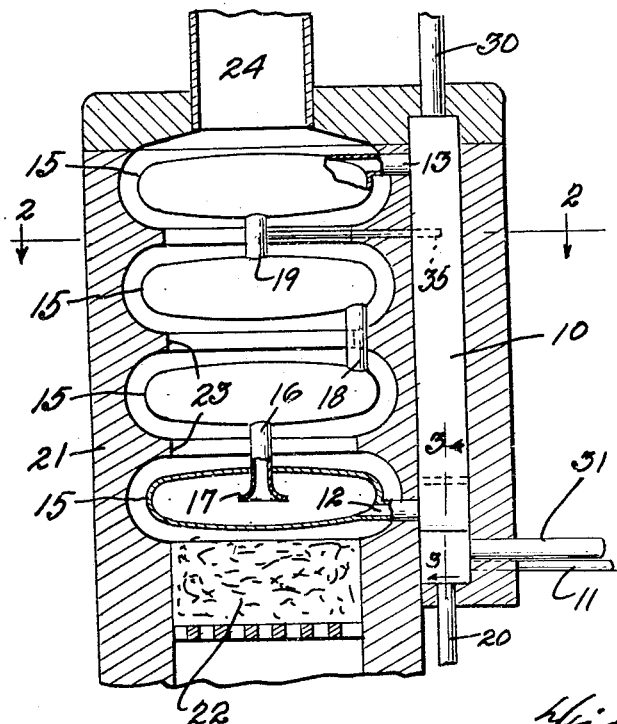
Figures 2, 3:
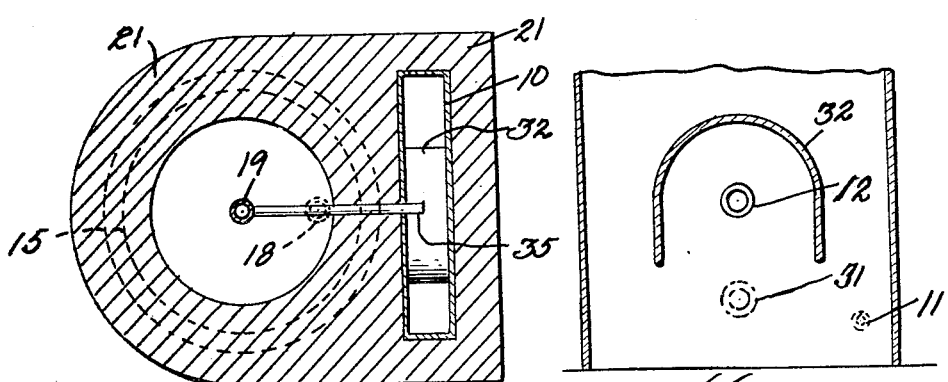
Fig. 2 is a section on line 2—2 of Fig. 1.
Fig. 3 is a section on line 3—3 of Fig. 1.

In the drawings the water containing elements comprise a rectangular storage portion 10 provided with a water supply pipe 11 and having a conduit 12 communicating with the elements which are within the heating chamber. This conduit 12 is, of course, near the bottom of the reservoir 10 and near the top of the latter is a second conduit 13 providing for the return of the heated water or steam as the case may be, to the reservoir after passing through the heating chambers of the furnace.

As shown clearly in the drawings and particularly in Fig. 1, the heating element of the installation comprises a series of preferably circular members 13 oval in vertical section and connected in a vertical series. It is preferred to alternate the connecting tubes at the center and at the side. For example, the connection between the lowermost element 15 and the next will be at the center through a tube 16 which preferably has its lower end well within the element 15 and flared as indicated at 17 in order to retard the circulation.

The connection between the intermediate elements 15 is preferably at one side through a tube 18, and the connection between the upper element 15 and the next lower one is through a centrally located tube 19. The elements 15 and connecting tubes 16, 18 and 19 and the reservoir member 10 are preferably built as a unit and the reservoir provided with a downwardly extending leg portion 20 upon which the weight of the assembly may be supported, while the whole assembly is preferably encased within a suitable refractory structure 21 made preferably of fire brick or other fire resisting material enclosing the entire assembly and embedding the reservoir 10 out of direct contact with the heating medium, but of course receiving heat conducted through the layer of refractory material in contact with its inner wall. The whole may then be covered in the conventional manner with a layer of material of low heat conductivity.

The reservoir instead of being enclosed within the refractory structure, may be on the outside thereof and covered with a suitable heat insulating material.

It is preferred to build the structure so that the elements 15 are supported within the passage conducting the hot combustion products from a suitable grate or other fire 22 and it is preferred to build the structure 21 so that the inner wall of the above mentioned passage follows approximately the contour of the elements 15, in that rings of the fire resistant material extend inwardly in a short distance between the elements 15 as indicated at 23. These rings force the hot gases to follow the curved outside of the element 15 and in close contact with the latter. Of course, the inner surface of the structure 21 will be spaced from the elements 15 a sufficient distance to allow the free passage of the combustion gases around the elements 15 and out through the flue 24.

The heated water or steam, as the case may be, from the upper portion of the reservoir 10 and the upper element 15 will pass out through the conduit 30 to the point of use and be returned through the conduit 31 to the lower part of the reservoir 10. This return water or condensed steam, as the case may be, enters the reservoir 10 under a shield element 32 which causes the circulating water within the device to pass down to the bottom of the reservoir on either side of shield element 32 before mixing with the colder water entering the conduit 12 to be further heated or reheated.

It is preferred to provide a short-circuiting pipe 35 leading from the connection 19, between the upper two elements 15, to the reservoir 10, especially when the device is to be used for steam generation. This permits the water to circulate through the lower elements 15 and the lower portion of reservoir 10 without crowding the steam out of the upper element 15.

The form of heating elements shown is to be preferred but other units may be used if desired.

It will thus be seen that a very intimate contact with the heat transferring walls is obtained by the heating medium due to the disc-like bodies of the liquid being heated and the application of the heating medium to both sides of the disc.

Now having described the invention and the preferred forms of embodiment thereof, it is to be understood that the said invention is to be limited, not to the specific details of description herein set forth, but only by the scope of the claims which follow.

I claim:

1. A liquid heating furnace comprising a fire resistant structure enclosing a series of disc-like elements adapted to contain the liquid to be heated and also enclosing a reservoir connected to the end members of such series, said structure providing means for supplying a heating medium to said disc-like members and conforming closely in internal contour to said series of members, whereby the heating medium will be compelled to follow closely the outer surfaces of said series of elements.

2. A liquid heating furnace comprising a receptacle made of fire brick and having a partition therein dividing the receptacle into two compartments, a vessel disposed in one of said compartments and adapted to contain the liquid to be heated and a reservoir disposed in the other of said compartments and adapted to contain heated liquid, the vessel being spaced a slight distance from the walls surrounding it to provide a heating space between it and the partition, the reservoir being in contact with the partition whereby it will receive heat transmitted therethru from the heating space, said vessel being connected to said reservoir at the top and at the bottom to provide a liquid circulating path, and also at an intermediate point to provide a short circuiting path for liquid circulation.

3. A liquid heating furnace comprising a receptacle made of fire brick and having a partition therein dividing the receptacle into two compartments, a vessel disposed in one of said compartments, and adapted to contain the liquid to be heated and a reservoir disposed in the other of said compartments and adapted to contain heated liquid, the vessel being spaced a slight distance from the walls surrounding it to provide a heating space between it and the partition, the reservoir being in contact with the partition whereby it will receive heat transmitted therethru from the heating space, said vessel being connected to said reservoir at the top and at the bottom to provide a liquid circulating path, said reservoir being further provided with an outlet and an inlet, and a baffle in the reservoir shielding the inlet and the lowermost connection between the reservoir and the vessel from the heated water in the upper part of the reservoir.

4. A liquid heating furnace comprising a receptacle made of fire brick and having a partition therein dividing the receptacle into two compartments, a vessel disposed in one of said compartments and adapted to contain the liquid to be heated and a reservoir disposed in the other of said compartments and adapted to contain heated liquid, the vessel being spaced a slight distance from the walls surrounding it to provide a heating space between it and the partition, the reservoir being in contact with the partition whereby it will receive heat transmitted therethru from the heating space, said vessel being connected to said reservoir at the top and at the bottom to provide a liquid circulating path, and also at an intermediate point to provide a short circuiting path for liquid circulation, said reservoir being further provided with an outlet and an inlet, and a baffle in the reservoir shielding the inlet and the lowermost connection between the reservoir and the vessel, from the heated water in the upper part of the reservoir.

Signed at the city of Detroit, county of Wayne and State of Michigan, this 31st day of October, 1929.

JOHN B. DUDLEY.